(12) United States Patent
Xu

(10) Patent No.: US 8,964,723 B2
(45) Date of Patent: Feb. 24, 2015

(54) DEVICES FOR SYNCHRONIZING A COMMUNICATION END DEVICE WITH A BASE STATION, METHODS FOR SYNCHRONIZING A COMMUNICATION END DEVICE WITH A BASE STATION, DEVICES FOR GENERATING A SECONDARY SYNCHRONIZATION SIGNAL, AND METHODS FOR GENERATING A SECONDARY SYNCHRONIZATION SIGNAL

(75) Inventor: Wen Xu, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 88 days.

(21) Appl. No.: 13/484,435

(22) Filed: May 31, 2012

(65) Prior Publication Data

US 2013/0321042 A1 Dec. 5, 2013

(51) Int. Cl.
*H04J 3/06* (2006.01)

(52) U.S. Cl.
USPC .......................................... 370/350; 370/324

(58) Field of Classification Search
USPC ....................................................... 370/350
See application file for complete search history.

(56) References Cited

U.S. PATENT DOCUMENTS

2009/0135804 A1* 5/2009 Swarts et al. ................. 370/350
2012/0046056 A1* 2/2012 Luo et al. ...................... 455/502

OTHER PUBLICATIONS 3 rd Generation Partnership Project; Technical Specification Group Radio Access Network; Evolved Universal Terrestrial Radio Access (E-UTRA); Physical Channels and Modulation (Release 8); 3GPP TS 36.211 V8.9.0 (Dec. 2009).*
3GPP TS 36.211, V8.9.0, 3rd Generation Partnership Project; Technical Specification Group Radio Access Network; Evolved Universal Terrestrial Radio Access (E-UTRA); Physical Channels and Modulation (release 8), Dec. 2009; 83 pages.
W. Xu and K. Manolakis, "Robust synchronization for 3GPP LTE system," Proc. of GLOBECOM*10, 2010 IEEE Global Telecommunications Conference, Miami, Dec. 6-10, 2010; 5 pages.
U. Ramacher et al, "Architecture and Implementation of a Software-Defined Radio Baseband Processor," in Proc. of IEEE International Symposium on Circuits and Systems (ISCAS), Rio de Janeiro, Brazil, May 2011; pp. 2193-2196.
A.G. Wassal and A. R. Elsherif, "Efficient implementation of secondary synchronization symbol detection in 3GPP LTE," in Proc. of IEEE International Symposium on Circuits and Systems (ISCAS), Rio de Janeiro, Brazil, May 2011; pp. 1680-1683.
Tensilica Instruction Extension—Wikipedia, the free encyclopedia. mht.

* cited by examiner

*Primary Examiner* — Yemane Mesfin
*Assistant Examiner* — Jeff Banthrongsack

(57) ABSTRACT

In an aspect of this disclosure, a device for synchronizing a communication end device with a base station may be provided. The device may include: a primary synchronization determiner configured to determine a first synchronization parameter; and a secondary synchronization signal generator configured to simultaneously generate a plurality of bits of a secondary synchronization signal based on the first synchronization parameter.

21 Claims, 2 Drawing Sheets

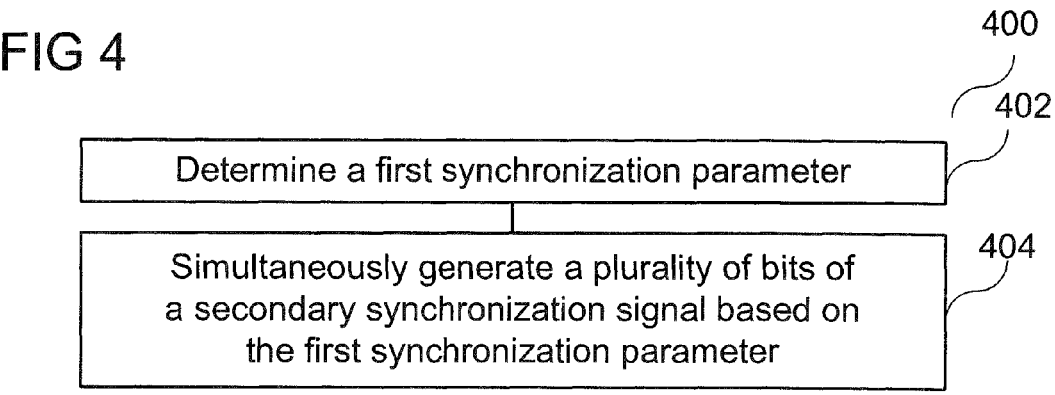
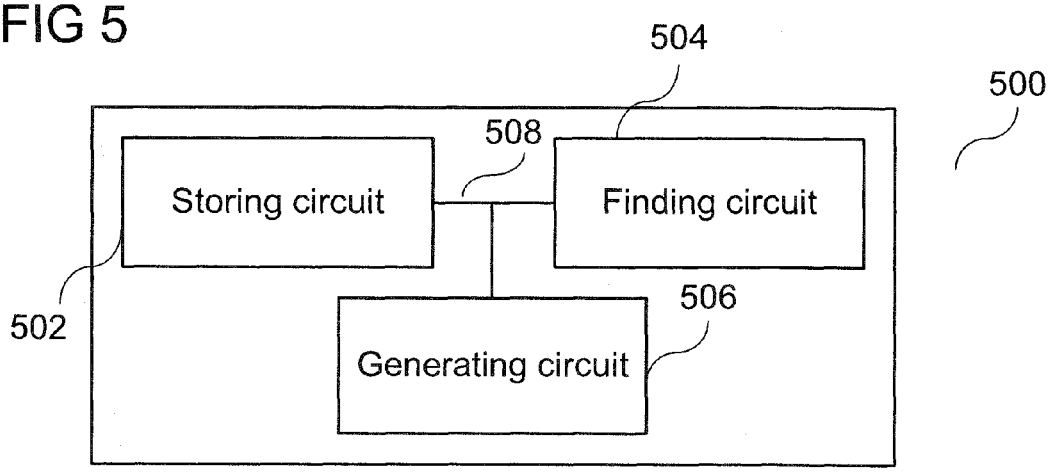
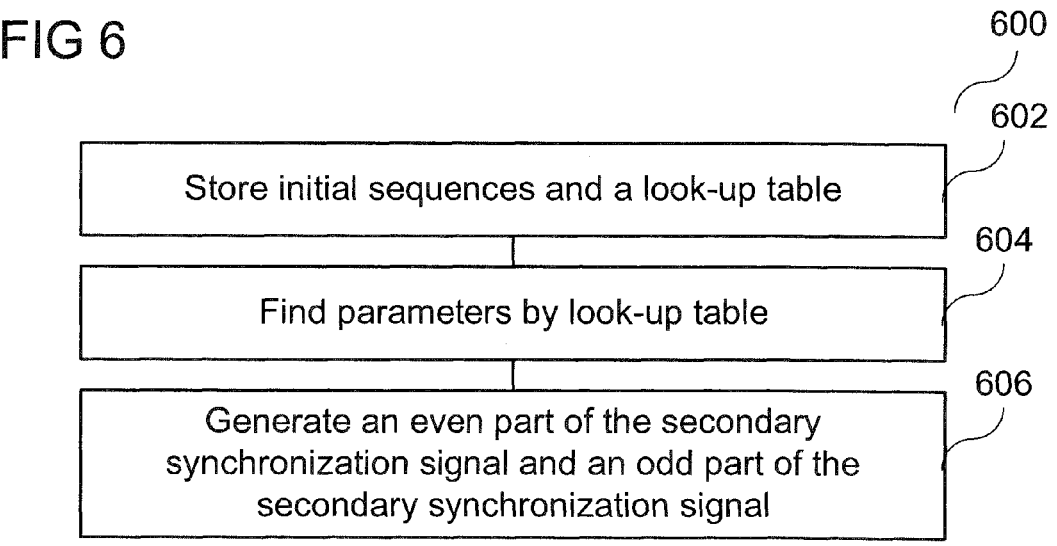

DEVICES FOR SYNCHRONIZING A COMMUNICATION END DEVICE WITH A BASE STATION, METHODS FOR SYNCHRONIZING A COMMUNICATION END DEVICE WITH A BASE STATION, DEVICES FOR GENERATING A SECONDARY SYNCHRONIZATION SIGNAL, AND METHODS FOR GENERATING A SECONDARY SYNCHRONIZATION SIGNAL

TECHNICAL FIELD

Aspects of this disclosure relate generally to devices for synchronizing a communication end device with a base station and methods for synchronizing a communication end device with a base station.

BACKGROUND

For communication between an end device and a base station, the end device may require synchronization with the base station.

SUMMARY

In an aspect of this disclosure, a device for synchronizing a communication end device with a base station may be provided. The device may include: a primary synchronization determiner configured to determine a first synchronization parameter; and a secondary synchronization signal generator configured to simultaneously generate a plurality of bits of a secondary synchronization signal based on the first synchronization parameter.

In an aspect of this disclosure, a method for synchronizing a communication end device with a base station may be provided. The method may include: determining a first synchronization parameter; and simultaneously generating a plurality of bits of a secondary synchronization signal based on the first synchronization parameter.

In an aspect of this disclosure, a device for synchronizing a communication end device with a base station may be provided. The device may include: a secondary synchronization signal generator configured to simultaneously generate a plurality of bits of a secondary synchronization signal based on a first synchronization parameter.

In an aspect of this disclosure, a method for synchronizing a communication end device with a base station may be provided. The method may include: simultaneously generating a plurality of bits of a secondary synchronization signal based on a first synchronization parameter.

In an aspect of this disclosure, a device for generating a secondary synchronization signal may be provided. The device may include a storing circuit configured to store initial sequences according to equation (12) and a look-up table, wherein equation (12) may be $$\tilde{s}(0)=[0,\tilde{s}(30),\tilde{s}(29),\ldots,\tilde{s}(0)]=\text{'0000 0100 1011 0011 1110 0011 0111 0101'}$$

$$\tilde{c}(0)=[0,\tilde{c}(30),\tilde{c}(29),\ldots,\tilde{c}(0)]=\text{'0000 0101 0111 0110 0011 1110 0110 1001'}$$

$$\tilde{z}(0)=[0,\tilde{z}(30),\tilde{z}(29),\ldots,\tilde{z}(0)]=\text{'0000 0111 0011 0111 1101 0001 0010 1011'} \quad (12),$$

and wherein lookup table may be

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |

| $N_{ID}^{(1)}$ | $m_0$ | $m_1$ |
|---|---|---|
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |

The device may further include a finding circuit, configured to find, for a given cell ID parameter $N_{ID}^{(1)}$, parameters $m_0$ and $m_1$ by the look-up table. The device may further include a generating circuit, configured to generate an even part of the secondary synchronization signal $d(2n)$ and an odd part of the secondary synchronization signal $d(2n+1)$ according to equation (14), wherein equation (14) may be $$d_{even} = [0, d(60), d(58), \ldots, d(2), d(0)] = \tilde{s}(m_0) XOR \tilde{c}(N_{ID}^{(2)})$$

$$d_{odd} = [0, d(61), d(59), \ldots, d(3), d(1)] = )XOR\tilde{z}(m_0 AND 7) XOR\tilde{c}(N_{ID}^{(2)}+3) \quad (1),$$

where XOR and AND are bit-wise binary XOR and AND operations.

In an aspect of this disclosure, a method for generating a secondary synchronization signal may be provided. The method may include storing initial sequences according to equation (12) and a look-up table, wherein equation (12) may be $$\tilde{s}(0) = [0, \tilde{s}(30), \tilde{s}(29), \ldots, \tilde{s}(0)] = \text{'0000 0100 1011 0011 1110 0011 0111 0101'}$$

$$\tilde{c}(0) = [0, \tilde{c}(30), \tilde{c}(29), \ldots, \tilde{c}(0)] = \text{'0000 0101 0111 0110 0011 1110 0110 1001'}$$

$$\tilde{z}(0) = [0, \tilde{z}(30), \tilde{z}(29), \ldots, \tilde{z}(0)] = \text{'0000 0111 0011 0111 1101 0001 0010 1011'} \quad (12),$$

and wherein lookup table may be

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |

-continued

| $N_{ID}^{(1)}$ | $m_0$ | $m_1$ |
| --- | --- | --- |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |

The method may further include finding, for a given cell ID parameter $N_{ID}^{(1)}$, parameters $m_0$ and $m_1$ by the look-up table. The method may further include generating an even part of the secondary synchronization signal d(2n) and an odd part of the secondary synchronization signal d(2n+1) according to equation (14), wherein equation (14) is $$d_{even}=[0,d(60),d(58), \ldots ,d(2),d(0)]=\tilde{s}(m_0)XOR\tilde{c}(N_{ID}^{(2)})$$

$$d_{odd}=[0,d(61),d(59),\ldots,d(3),d(1)]=)XOR\tilde{z}(m_0 AND 7) XOR\tilde{c}(N_{ID}^{(2)}+3) \quad (2),$$

where XOR and AND are bit-wise binary XOR and AND operations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 4 shows a flow diagram illustrating a method for synchronizing a communication end device with a base station in accordance with an aspect of this disclosure;

FIG. 5 shows a device for generating a secondary synchronization signal in accordance with an aspect of this disclosure; and FIG. 6 shows a flow diagram illustrating a method for generating a secondary synchronization signal in accordance with an aspect of this disclosure.

DESCRIPTION

Figure 1:
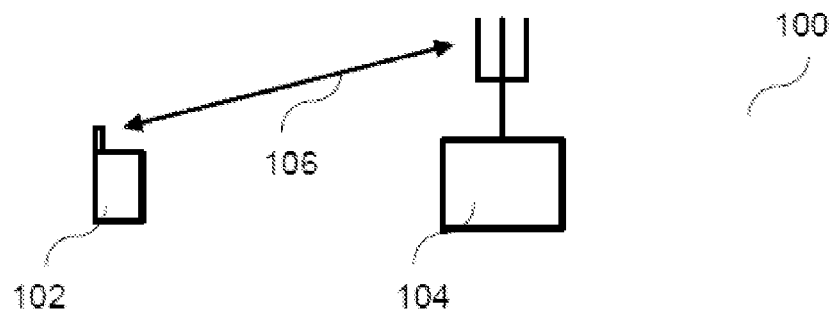
FIG. 1 shows a communication end device and a base station in accordance with an aspect of this disclosure.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A communication end device (which may also be referred to as end device) according to various aspects of this disclosure may be a device configured for wired communication, for example a desktop computer or laptop, or for wireless communication, for example a radio communication device. In various aspects of this disclosure, a radio communication device may be an end-user mobile device (MD). In various aspects of this disclosure, a radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m. In various aspects of this disclosure, a recipient may also be referred to as a callee. In various aspects of this disclosure, a recipient identifier may be at least one of a dialing number and a symbolic address.

The device for synchronizing a communication end device with a base station may include a memory which may for example be used in the processing carried out by the device for synchronizing a communication end device with a base station. A memory used in various aspects of this disclosure may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

In various aspects of this disclosure, a "circuit" may be understood as any kind of a logic implementing entity, which may be special purpose circuitry or a processor executing software stored in a memory, firmware, or any combination thereof. Thus, in various aspects of this disclosure, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit" in accordance with an alternative aspect of this disclosure.

Various aspects of this disclosure are provided for devices, and various aspects of this disclosure are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a communication end device 102 and a base station 104 in accordance with an aspect of this disclosure. The communication end device 102 and the base station 104 may desire to communicate, for example communicate wirelessly, like indicated by an arrow 106. In order to be able to communicate with each other, the communication end device 102 and the base station 104 may desire to synchronize with each other. For example, the communication end device 102 may desire to establish synchronization with the base station 104.

Figure 2:
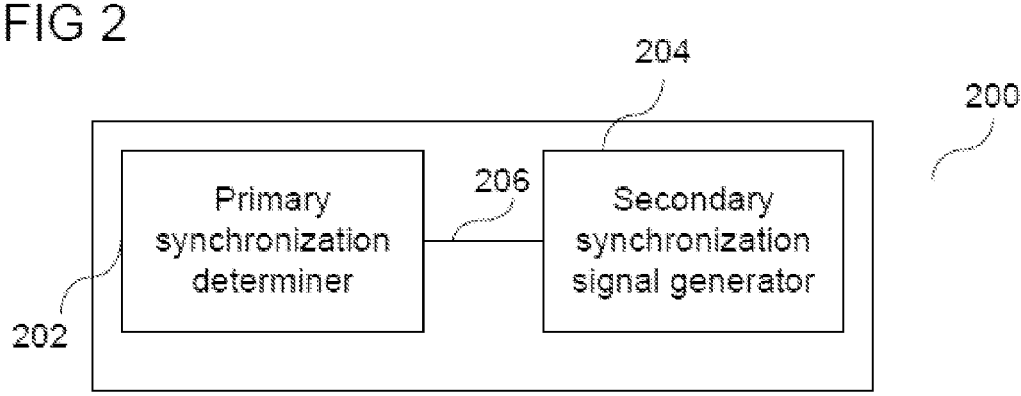
FIG. 2 shows a device for synchronizing a communication end device with a base station in accordance with an aspect of this disclosure.

FIG. 2 shows a device 200 for synchronizing a communication end device with a base station in accordance with an aspect of this disclosure. The device 200 may include a primary synchronization determiner 202 (or a primary synchronization determination circuit 202) configured to determine a first synchronization parameter. The device 200 may further include a secondary synchronization signal generator 204 (or a secondary synchronization signal generation circuit 204) configured to simultaneously generate a plurality of bits of a secondary synchronization signal based on the first synchronization parameter. The primary synchronization determiner 202, and the secondary synchronization signal generator 204 may be coupled with each other, e.g. via a connection 206, for example an optical connection or an electrical connection, such as e.g. a cable or a computer bus or via any other suitable electrical connection to exchange electrical signals. In various aspects of this disclosure, the primary synchronization determiner 202 may determine the first synchronization parameter in a cell search procedure. In various aspects of this disclosure, the primary synchronization determiner 202 may determine the first synchronization parameter by reading a parameter from a set (or list) of parameter candidates (in other words: from a set (or list) of possible parameters).

Figure 3:
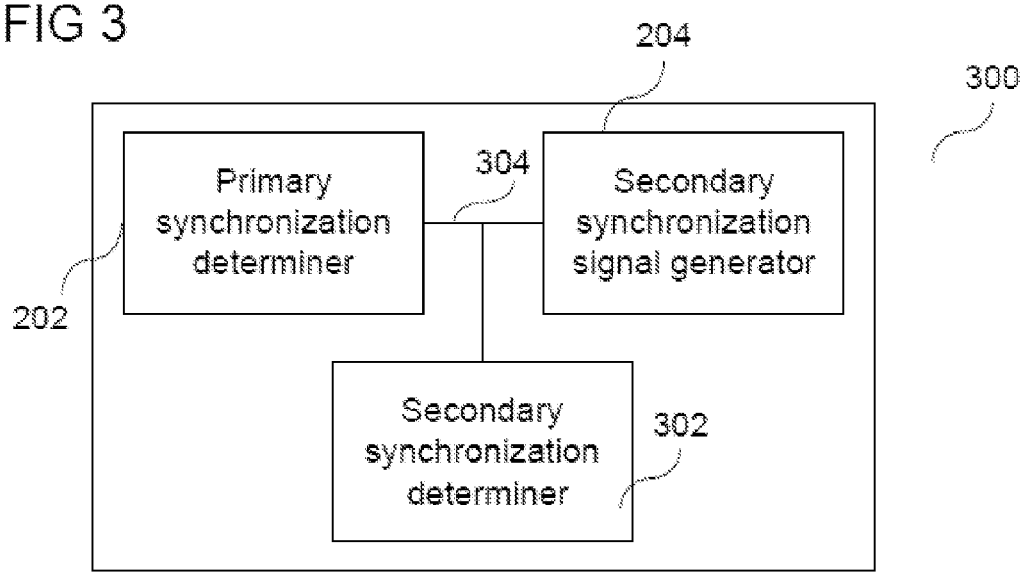
FIG. 3 shows a device for synchronizing a communication end device with a base station in accordance with an aspect of this disclosure.

FIG. 3 shows a device 300 for synchronizing a communication end device with a base station in accordance with an aspect of this disclosure. The device 300 may, similar to the device 200 of FIG. 2, include a primary synchronization determiner 202 (or a primary synchronization determination circuit 202) configured to determine a first synchronization parameter. The device 300 may, similar to the device 200 of FIG. 2, further include a secondary synchronization signal generator 204 (or a secondary synchronization signal generation circuit 204) configured to simultaneously generate a plurality of bits of a secondary synchronization signal based on the first synchronization parameter. The device 300 may further include a secondary synchronization determiner 302 (or a secondary synchronization determination circuit 302) configured to deter nine a second synchronization parameter based on the secondary synchronization signal. The primary synchronization determiner 202, the secondary synchronization signal generator 204 and the secondary synchronization determiner 302 may be coupled with each other, e.g. via a connection 304, for example an optical connection or an electrical connection, such as e.g. a cable or a computer bus or via any other suitable electrical connection to exchange electrical signals.

In an aspect of this disclosure, the second synchronization parameter may include or may be a cell group identifier.

In an aspect of this disclosure, the first synchronization parameter may include or may be a sector identifier.

In an aspect of this disclosure, the secondary synchronization signal may include or may be a long term evolution (LTE) secondary synchronization signal.

In an aspect of this disclosure, the device 300 may further include a general purpose processor (not shown). In an aspect of this disclosure the secondary synchronization signal generator may be implemented on the general purpose processor.

In an aspect of this disclosure, the device 300 may further include a digital signal processor (not shown). In an aspect of this disclosure the secondary synchronization signal generator may be implemented on the digital signal processor.

In an aspect of this disclosure, the device 300 may further include a configurable cores processor (not shown). In an aspect of this disclosure the secondary synchronization signal generator may be implemented on the configurable cores processor. A configurable cores processor may be understood as an evolved digital signal processor (DSP), where parts of the program to be executed by the DSP may be executed by dedicated configurable hardware.

In an aspect of this disclosure, the device 300 may further include a field-programmable gate array (not shown). In an aspect of this disclosure the secondary synchronization signal generator may be implemented on the field-programmable gate array.

In an aspect of this disclosure, the device 300 may be the communication end device.

In an aspect of this disclosure, the secondary synchronization signal generator may be configured to simultaneously generate the plurality of bits of the secondary synchronization signal based on computing a logical operation on the first synchronization parameter.

In an aspect of this disclosure, the logical operation may include or may be one or more of the following: an exclusive OR (XOR) operation; an AND operation; an OR operation; a not-AND (NAND) operation; and a not-OR (NOR) operation.

FIG. 4 shows a flow diagram 400 illustrating a method for synchronizing a communication end device with a base station in accordance with an aspect of this disclosure. In 402, a first synchronization parameter may be determined, for example by a primary synchronization determiner. In 404, a plurality of bits of a secondary synchronization signal may be generated simultaneously based on the first synchronization parameter, for example by a secondary synchronization signal generator. In various aspects of this disclosure, the first synchronization parameter may be determined in a cell search procedure. In various aspects of this disclosure, the first synchronization parameter may be determined by reading a parameter from a set (or list) of parameter candidates (in other words: from a set (or list) of possible parameters).

In an aspect of this disclosure, the method may further include determining a second synchronization parameter based on the secondary synchronization signal. This determining of the second synchronization parameter may be performed for example by a secondary synchronization determiner.

In an aspect of this disclosure, the second synchronization parameter may include or may be a cell group identifier.

In an aspect of this disclosure, the first synchronization parameter may include or may be a sector identifier.

In an aspect of this disclosure, the secondary synchronization signal may include or may be a long term evolution secondary synchronization signal.

In an aspect of this disclosure, simultaneously generating the plurality of bits of the secondary synchronization signal may be performed on a general purpose processor.

In an aspect of this disclosure, simultaneously generating the plurality of bits of the secondary synchronization signal may be performed on a digital signal processor.

In an aspect of this disclosure, simultaneously generating the plurality of bits of the secondary synchronization signal may be performed on a configurable cores processor.

In an aspect of this disclosure, simultaneously generating the plurality of bits of the secondary synchronization signal may be performed on a field-programmable gate array.

In an aspect of this disclosure, the method may be performed in the communication end device.

In an aspect of this disclosure, the plurality of bits of the secondary synchronization signal may be simultaneously generated based on computing a logical operation on the first synchronization parameter.

In an aspect of this disclosure, the logical operation may include or may be one or more of the following: an exclusive OR (XOR) operation; an AND operation; an OR operation; a not-AND (NAND) operation; and a not-OR (NOR) operation.

FIG. 5 shows a device 500 for generating a secondary synchronization signal in accordance with an aspect of this disclosure. The device 500 may include a storing circuit 502 configured to store initial sequences according to equation (12) and a look-up table, wherein equation (12) is $$\tilde{s}(0)=[0,\tilde{s}(30),\tilde{s}(29),\ldots,\tilde{s}(0)]=\text{'0000 0100 1011 0011 1110 0011 0111 0101'}$$

$$\tilde{c}(0)=[0,\tilde{c}(30),\tilde{c}(29),\ldots,\tilde{c}(0)]=\text{'0000 0101 0111 0110 0011 1110 0110 1001'}$$

$$\tilde{z}(0)=[0,\tilde{z}(30),\tilde{z}(29),\ldots,\tilde{z}(0)]=\text{'0000 0111 0011 0111 1101 0001 0010 1011'} \quad (12),$$

and wherein lookup table is

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |

-continued

| $N_{ID}^{(1)}$ | $m_0$ | $m_1$ |
|---|---|---|
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

The device 500 may further include a finding circuit 504, configured to find, for a given cell ID parameter $N_{ID}^{(1)}$, parameters $m_0$ and $m_1$ by the look-up table. The device 500 may further include a generating circuit 506, configured to generate an even part of the secondary synchronization signal $d(2n)$ and an odd part of the secondary synchronization signal $d(2n+1)$ according to equation (14), wherein equation (14) is $$d_{even}=[0,d(60),d(58),\ldots,d(2),d(0)]=\tilde{s}(m_0)\text{XOR}\tilde{c}(N_{ID}^{(2)})$$

$$d_{odd}=[0,d(61),d(59),\ldots,d(3),d(1)]=)\text{XOR}\tilde{z}(m_0\text{AND}7)\text{XOR}\tilde{c}(N_{ID}^{(2)}+3) \quad (3),$$

where XOR and AND are bit-wise binary XOR and AND operations. The storing circuit 502, the finding circuit 504, and the generating circuit 506 may be coupled with each other, e.g. via a connection 508, for example an optical connection or an electrical connection, such as e.g. a cable or a computer bus or via any other suitable electrical connection to exchange electrical signals.

FIG. 6 shows a flow diagram 600 illustrating a method for generating a secondary synchronization signal in accordance with an aspect of this disclosure. In 602, initial sequences according to equation (12) and a look-up table may be stored, for example by a storing circuit, wherein equation (12) is $$\tilde{s}(0)=[0,\tilde{s}(30),\tilde{s}(29),\ldots,\tilde{s}(0)]=\text{'0000 0100 1011 0011 1110 0011 0111 0101'}$$

$$\tilde{c}(0)=[0,\tilde{c}(30),\tilde{c}(29),\ldots,\tilde{c}(0)]=\text{'0000 0101 0111 0110 0011 1110 0110 1001'}$$

$$\tilde{z}(0)=[0,\tilde{z}(30),\tilde{z}(29),\ldots,\tilde{z}(0)]=\text{'0000 0111 0011 0111 1101 0001 0010 1011'} \quad (12),$$

and wherein lookup table is

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |

| $N_{ID}^{(1)}$ | $m_0$ | $m_1$ |
|---|---|---|
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

In 604, for a given cell ID parameter $N_{ID}^{(1)}$, parameters $m_0$ and $m_1$ may be found by the look-up table (for example by a finding circuit). In 606, an even part of the secondary synchronization signal d(2n) and an odd part of the secondary synchronization signal d(2n+1) may be generated (for example by a generating circuit) according to equation (14), wherein equation (14) is $$d_{even} = [0, d(60), d(58), \ldots, d(2), d(0)] = \tilde{s}(m_0) XOR \tilde{c}(N_{ID}^{(2)})$$

$$d_{odd} = [0, d(61), d(59), \ldots, d(3), d(1)] = )XOR\tilde{z}(m_0 AND 7) XOR \tilde{c}(N_{ID}^{(2)}+3) \quad (4),$$

where XOR and AND are bit-wise binary XOR and AND operations.

In an aspect of this disclosure, a device for synchronizing a communication end device with a base station may be provided. The device may include a secondary synchronization signal generator configured to simultaneously generate a plurality of bits of a secondary synchronization signal based on a first synchronization parameter.

In an aspect of this disclosure, a method for synchronizing a communication end device with a base station in accordance may be provided. The method may include simultaneously generating a plurality of bits of a secondary synchronization signal based on a first synchronization parameter. This simultaneously generating may be performed for example by a secondary synchronization signal generator.

In an aspect of this disclosure, the devices and methods may be configured according to at least one of the following radio communication technologies: a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput), Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

In an aspect of this disclosure, an efficient method to generate the LTE (Long Term Evolution) secondary synchronization signal (SSS) on a DSP may be provided.

In an aspect of this disclosure, in cellular systems, synchronization and cell search may be the very first task when a user equipment (UE) tries to establish a connection with a base station, for example an evolved Node B (eNB) in terms of the 3GPP LTE and LTE-A (advanced), such as in the case of call setup or handover, etc. In all these cases, the primary synchronization signals (PSS) and the secondary synchronization signals (SSS) may be desired. There may be 3 length-62 PSSs specified, and usually they may be pre-computed and stored in ROM of the dedicated HW or DSP. The number of SSSs may be much higher, for example 1008 length-62 sequences. For cost reasons, they may usually not be pre-computed and stored in the dedicated HW or DSP. Instead, the SSS sequences may normally be generated on-line or on-demand, either in HW or DSP.

For HW or DSP, the SSS sequences may usually be generated bit-by bit. Even with a dedicated HW, generation of one SSS sequence may take at least several dozens of cycles. With a DSP, the bit-by-bit generation of the SSS may take much longer, since at least several lines of source code are needed to generate each bit. In other words, commonly used methods on DSP are to generate the SSS sequence bit-by-bit, or to store the pre-computed SSS in memory (ROM). The former implementation may take much more time, and the latter may result in more costs.

In an aspect of this disclosure, a method to generate multiple bits of the LTE SSS sequence simultaneously may be provided. It may ensure that a SSS sequence may be generated quickly, for example using a DSP.

In an aspect of this disclosure, a method and a communication device including at least a transmitter or a receiver, a DSP embedded in or co-existing with the transmitter or receiver may be provided, where the DSP may generate online multiple bits of the LTE SSS sequence simultaneously.

In an aspect of this disclosure, a method for generating the LTE secondary synchronization signal (SSS), for example on a DSP or a general purpose computer, may be provided.

In an aspect of this disclosure, the m-sequences $\tilde{s}(.)$, $\tilde{c}(.)$, $\tilde{z}(.)$, like will be described in more detail below, may be stored as integer variables, with one bit of the integer variable representing one binary digit, and may be initialized with pre-computed values. The SSS sequences may then be generated by bit-wise XOR of the left- or right-shifted integer variables $\tilde{s}(.)$, $\tilde{c}(.)$, $\tilde{z}(.)$.

In an aspect of this disclosure, like stated above, in cellular systems, synchronization may be the very first task when a user equipment (UE) tries to establish a connection or reconnection with a base station, for example an evolved Node B (eNB) in terms of the 3GPP LTE.

In an aspect of this disclosure, in LTE, the system synchronization may usually be accomplished first in downlink (DL) and then in uplink (UL). For example, the UE may perform an initial time and frequency offset estimation by detecting synchronization signals of eNBs. In an aspect of this disclosure, when this is successful, the UE may acquire the frame structure of the DL signal, and may read basic system information (for example cell identity, DL bandwidth, etc.). In an aspect of this disclosure, after this, the UE may transmit back the physical random access channel (PRACH) signal. In an aspect of this disclosure, the eNB may then detect the PRACH, estimate the transmit timing of the UE, identify the UE, etc.

In an aspect of this disclosure, in LTE, a total of 504 cell IDs may be defined as $$N_{ID}^{cell} = 3N_{ID}^{(1)} + N_{ID}^{(2)} \quad (5)$$

where $N_{ID}^{(1)} = 0, 1, \ldots, 167$ may be the physical-layer cell group ID and $N_{ID}^{(2)} = 0, 1, 2$ the physical layer ID (sometimes called the sector ID) within a cell group.

In an aspect of this disclosure, the information on $N_{ID}^{(2)}$, which may be the first synchronization parameter, and $N_{ID}^{(1)}$, which may be the second synchronization parameter, may be carried through two DL synchronization signals of an eNB, i.e. the primary synchronization signal (PSS) and secondary synchronization signal (SSS). The information on the 3 values $N_{ID}^{(2)} = 0, 1, 2$ may be carried by 3 different PSSs generated by (2) using u=25, 29, 34, i.e. u=25 may correspond to N $N_{ID}^{(2)} = 0$; u=29 may correspond to $N_{ID}^{(2)} = 1$; and u=34 may correspond to $N_{ID}^{(2)} = 2$. The information on $N_{ID}^{(2)}$ may also contained in SSSs (see Eq. (7)). The information on the 168 values $N_{ID}^{(1)} = 0, 1, \ldots, 167$ may be carried by different SSSs. It is to be noticed that SSS may contain information on both $N_{ID}^{(2)}$ and $N_{ID}^{(1)}$, whereas PSS may contain only information on $N_{ID}^{(2)}$. In an aspect of this disclosure, the PSS may be embedded in the last OFDM symbol and the SSS in the second last OFDM symbol, of the subframe 0 and 5 in each radio frame. In an aspect of this disclosure, once a UE successfully detects and decodes the PSS and SSS, the cell ID of the eNB may be determined.

In an aspect of this disclosure, the PSS may be chosen from a class of the Zadoff-Chu (ZC) sequences defined as $$d_u(k) = e^{-j\frac{\pi u k(k+1)}{N_{ZC}}} \quad 0 \le k < N_{ZC} \tag{6}$$

where $N_{ZC}$ may be the ZC sequence length and u may be the ZC root index relatively prime to $N_{ZC}$. In an aspect of this disclosure, the ZC sequence may have the constant-amplitude zero autocorrelation (CAZAC). In an aspect of this disclosure, in the release 8 LTE, $N_{ZC}=63$ may be chosen for PSS in frequency domain. In an aspect of this disclosure, $d_u(31)$ may correspond to DC subcarrier and may not be transmitted. In an aspect of this disclosure, the three values $N_{ID}^{(2)}=0, 1, 2$ may be represented by the PSSs with three different ZC root indices u=25, 29, 34, respectively, and decoding $N_{ID}^{(2)}$ may mean to determine u.

In an aspect of this disclosure, similar to the PSS, the SSS may have 62 non-zero elements in frequency domain. In an aspect of this disclosure, the 62 elements may be an interleaved concatenation of two length-31 binary sequences, each taking 31 different values corresponding to 31 cyclic shifts of an m-sequence. In an aspect of this disclosure, the shifts may be derived from $N_{ID}^{(1)}$. In an aspect of this disclosure, the two length-31 sequences may then be scrambled with the scrambling sequences derived depending on $N_{ID}^{(2)}$. In an aspect of this disclosure, contrary to the PSS, the SSS in subframe 0 and 5 may be different from each other. In an aspect of this disclosure, this property may be used to distinguish the subframe 0 from the subframe 5, and thus to identify the BOF (beginning of frame). In an aspect of this disclosure, for each $N_{ID}^{(2)}$, there may be 168 length-62 SSS sequences. In an aspect of this disclosure, for all 3 sectors and the subframe 0 and 5, there may therefore be a total of 1008 length-62 SSS sequences.

In an aspect of this disclosure, for cell search, it may first be desired to generate the PSS and SSS sequences. In an aspect of this disclosure, the usual and perhaps the simplest way/procedure for a cell search is to detect the sector ID $N_{ID}^{(2)}$ in time domain, and the group ID $N_{ID}^{(1)}$ in frequency domain. Correspondingly, in an aspect of this disclosure, the SSS sequences may be generated in frequency domain. In an aspect of this disclosure, the three PSS sequences either in time or frequency domain may need very small space to store and therefore may be first generated offline and directly stored in HW (hardware) or DSP (digital signal processor) for future use. For the 1008 SSS sequences, the commonly used way is to generate it online by a dedicated HW, in order to save storage space. This, however, may not be used in case no such a dedicated HW is available, e.g. when cell search needs to be implemented on a DSP, such as the Intel's X-GOLD™ SDR20 baseband processor. The brute force generation of the SSS on a DSP or general purpose computer may usually be awkward. Up to now, no efficient method has been reported. In an aspect of this disclosure, an efficient method may be provided.

In an aspect of this disclosure, an efficient method for generating the SSS on a DSP may be provided.

In the following, the SSS generation procedure specified in 3GPP will be analyzed and it will be shown how to quickly generate a SSS, for example on a 32-bit DSP or general purpose computer, in an aspect of this disclosure.

In the following, the LTE SSS sequences will be described.

In an aspect of this disclosure, the length-62 SSS sequence $d(0), \ldots, d(61)$ may formally be defined as follows $$d(2n) = \begin{cases} s_0^{(m_0)}(n)c_0(n) & \text{in subframe 0} \\ s_1^{(m_1)}(n)c_0(n) & \text{in subframe 5} \end{cases} \tag{7}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

where $0 \le n \le 30$. In an aspect of this disclosure, the indices $m_0$ and $m_1$ may be derived from the group ID $N_{ID}^{(1)}$ according to $$m_0 = m' \bmod 31 \tag{8}$$

$$m_1 = (m_0 + \lfloor m'/31 \rfloor + 1) \bmod 31$$

$$m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$$

where the output of the above expression may also explicitly be listed in a look-up table, see Table 1.

In an aspect of this disclosure, the two sequences $s_0^{(m_0)}(n)$ and $s_1^{(m_1)}(n)$ may be defined as two different cyclic shifts of the m-sequence $\tilde{s}(n)$ according to $$s_0^{(m_0)}(n) = \tilde{s}((n+m_0) \bmod 31)$$

$$s_0^{(m_1)}(n) = \tilde{s}((n+m_1) \bmod 31) \tag{9}$$

where $\tilde{s}(i) = 1-2x(i)$, $0 \le i \le 30$, may be defined by $$x(\bar{i}+5) = (x(\bar{i}+2) + x(\bar{i})) \bmod 2, \quad 0 \le \bar{i} \le 25 \tag{10}$$

with initial conditions $x(0)=0$, $x(1)=0$, $x(2)=0$, $x(3)=0$, $x(4)=1$.

In an aspect of this disclosure, the two scrambling sequences $c_0(n)$ and $c_1(n)$ may depend on the PSS $N_{ID}^{(2)}$ and may be defined by two different cyclic shifts of the m-sequence $\tilde{c}(n)$ according to $$c_0(n) = \tilde{c}((n+N_{ID}^{(2)}) \bmod 31)$$

$$c_1(n) = \tilde{c}((n+N_{ID}^{(2)}+3) \bmod 31) \tag{11}$$

where $N_{ID}^{(2)} \in \{0, 1, 2\}$ may be the physical-layer ID within the cell identity group $N_{ID}^{(1)}$ and $\tilde{c}(i) = 1-2x(i)$, $0 \le i \le 30$, may be defined by $$x(\bar{i}+5) = (x(\bar{i}+3) + x(\bar{i})) \bmod 2, \quad 0 \le \bar{i} \le 25 \tag{12}$$

with initial conditions $x(0)=0$, $x(1)=0$, $x(2)=0$, $x(3)=0$, $x(4)=1$.

TABLE 1

Mapping between physical-layer cell-identity group $N_{ID}^{(1)}$ and the indices $m_0$ and $m_1$.

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |

TABLE 1-continued

Mapping between physical-layer cell-identity group $N_{ID}^{(1)}$ and the indices $m_0$ and $m_1$.

| $N_{ID}^{(1)}$ | $m_0$ | $m_1$ |
| --- | --- | --- |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

In an aspect of this disclosure, the scrambling sequences $z_1^{(m_0)}(n)$ and $z_1^{(m_1)}(n)$ may be defined by a cyclic shift of the m-sequence $\tilde{z}(n)$ according to $$z_1^{(m_0)}(n)=\tilde{z}((n+(m_0 \bmod 8))\bmod 31)$$

$$z_1^{(m_1)}(n)=\tilde{z}((n+m_1 \bmod 8))\bmod 31) \quad (13)$$

where $m_0$ and $m_1$ may be obtained from Table 1 and $\tilde{z}(i)=1-2x(i)$, $0 \le i \le 30$, may be defined by $$x(\bar{i}+5)=(x(\bar{i}+4)+x(\bar{i}+2)+x(\bar{i}+1)+x(\bar{i}))\bmod 2, 0 \le \bar{i} \le 25 \quad (14)$$

with initial conditions $x(0)=0$, $x(1)=0$, $x(2)=0$, $x(3)=0$, $x(4)=1$.

In the following, generation of the LTE SSS sequences on a DSP in an aspect of this disclosure will be described.

Now Eqs. (9), (11) and (13) may be inserted into (7), then the frequency domain SSS sequence in subframe 0 may be expressed, for $0 \le n \le 30$, as $$d(2n)=\tilde{s}(n+m_0)\tilde{c}(n+N_{ID}^{(2)})$$

$$d(2n+1)=\tilde{s}(n+m_1)\tilde{z}(n+(m_0 \bmod 8))\tilde{c}(n+N_{ID}^{(2)}+3) \quad (15)$$

where $\tilde{s}(n), \tilde{c}(n), \tilde{z}(n) \in \{\pm 1\}$ may be the pre-defined length-31 binary m-sequences. For the index n outside of the range $0 \le n \le 30$, the modulo 31 may apply, i.e. $\tilde{s}(n)=\tilde{s}(n \bmod 31)$, $\tilde{z}(n)=\tilde{z}(n \bmod 31)$ and $\tilde{c}(n)=\tilde{c}(n \bmod 31)$. It is to be noted that the frequency domain SSS sequence in subframe 5 may be obtained by simply exchanging the shift index $m_0$ with $m_1$ in Eq. (15). From above, it becomes clear that a SSS sequence may be a function of both the sector ID $N_{ID}^{(2)}$ and the group ID $N_{ID}^{(1)}$. When a received signal contains a specific SSS, then it is possible to detect this specific SSS from the received signal. This may be referred to as the cell search. This may be accomplished, e.g. by conducting cross-correlation between the received signal and the all possible 1008 SSS sequences. The SSSs which have high correlation values may be the SSSs of the desired cells we would like to search. In other words, the first synchronization parameter $N_{ID}^{(2)}$ may be determined by finding a value for $N_{ID}^{(2)}$ for which the primary synchronization signal, generated by Equation (2), has high correlation with the received PSS, and the second synchronization parameter $N_{ID}^{(1)}$ may be determined by finding a value for $N_{ID}^{(1)}$ for which the secondary synchronization signal, generated like described by Equation (14), has high correlation with the received SSS.

In an aspect of this disclosure, the key observations from (15) may be:

a) For all $0 \le n \le 30$, $d(2n)$ and $d(2n+1)$ can be computed independently and therefore simultaneously.
b) All involved sequences $\tilde{s}(n), \tilde{c}(n), \tilde{z}(n)$ are binary. For each n, $\tilde{s}(n), \tilde{c}(n), \tilde{z}(n)$ can therefore be stored with 1 bit, with '0'=+1, and '1'=−1.

In an aspect of this disclosure, the 31 bits of the m-sequences $\tilde{s}(n), \tilde{c}(n), \tilde{z}(n)$ may thus be represented with three 32-bit integer variables, initialized with the pre-computed binary values from equations (3)-(10)

$$\tilde{s}(0)=[0,\tilde{s}(30),\tilde{s}(29),\ldots,\tilde{s}(0)]=\text{'0000 0100 1011 0011 1110 0011 0111 0101'}$$

$$\tilde{c}(0)=[0,\tilde{c}(30),\tilde{c}(29),\ldots,\tilde{c}(0)]=\text{'0000 0101 0111 0110 0011 1110 0110 1001'}$$

$$\tilde{z}(0)=[0,\tilde{z}(30),\tilde{z}(29),\ldots,\tilde{z}(0)]=\text{'0000 0111 0011 0111 1101 0001 0010 1011'} \quad (16)$$

or in the form of decimal numbers $$\tilde{s}(0)=[0,\tilde{s}(30),\tilde{s}(29),\ldots,\tilde{s}(0)]=78898037$$

$$\tilde{c}(0)=[0,\tilde{c}(30),\tilde{c}(29),\ldots,\tilde{c}(0)]=91635305$$

$$\tilde{z}(0)=[0,\tilde{z}(30),\tilde{z}(29),\ldots,\tilde{z}(0)]=121098539$$

In an aspect of this disclosure, here, without loss of generality, it may be assumed that the most significant bit (MSB) denoted as 0 is unused or ignored. Furthermore, in an aspect of this disclosure, the circularly right-shift of the sequences $\tilde{s}(0), \tilde{c}(0), \tilde{z}(0)$ by m bits may be denoted as follows $$\tilde{s}(0)=[0,\tilde{s}(30),\tilde{s}(29),\ldots,\tilde{s}(0)]=\text{'0000 0100 1011 0011 1110 0011 0111 0101'}$$

$$\tilde{c}(0)=[0,\tilde{c}(30),\tilde{c}(29),\ldots,\tilde{c}(0)]=\text{'0000 0101 0111 0110 0011 1110 0110 1001'}$$

$$\tilde{z}(0)=[0,\tilde{z}(30),\tilde{z}(29),\ldots,\tilde{z}(0)]=\text{'0000 0111 0011 0111 1101 0001 0010 1011'} \quad (17)$$

Then, in an aspect of this disclosure, the even part of the SSS $d(2n)$, and the odd part of the SSS $d(2n+1)$, may be written as $$d_{even}=[0,d(60),d(58),\ldots,d(2),d(0)]=\tilde{s}(m_0)\text{XOR}\tilde{c}(N_{ID}^{(2)})$$

$$d_{odd}=[0,d(61),d(59),\ldots,d(3),d(1)]=\tilde{s}\text{XOR}\tilde{z}(m_0 \text{AND} 7)\text{XOR}\tilde{c}(N_{ID}^{(2)}+3) \quad (18)$$

where XOR and AND may be bit-wise binary XOR and AND operations. It is to be noted that the modular operation in Eq. (15) may be implemented now as a bit-wise AND, $m_0$ mod $8 = m_0$ AND 7, since a binary AND may only desire 1 cycle on a 32-bit DSP or general purpose computer. The binary representation of 7 is '0111'. The SSS generated for a specific cell ID may be used to correlate with the received signal, in order to determine whether the received signal contains a signal from a cell with this cell ID (i.e. cell detection, or cell search). It may also be used to determine the channel coefficients, or the signal strength, of the signal from the cell with this cell ID.

In an aspect of this disclosure, as described above, by utilizing the specific property of the SSS generation procedure, the 31 even bits and 31 odd bits of an SSS sequence may be generated simultaneously with several computer circles. In an aspect of this disclosure, the required data and program memory may be small. In an aspect of this disclosure, the procedure may look like follows:

a) Store initial m-sequences according to Eq. (16) and the look-up table, Table 1
b) For a given cell ID parameter, $N_{ID}^{(1)}$, find the corresponding parameters $m_0$ and $m_1$, by the look-up table
c) Compute Eq. (18)

In an aspect of this disclosure, since the 31 bits of the SSS sequence may be generated online at the same time, this method may at least be 31 times faster than the conventional method in which the 31 bits are generated sequentially according to Eq. (7) to (13), when the conventional method is implemented on the same DSP or general purpose computer. Because with a dedicated HW, the SSS is usually generated bit-by-bit, the above described method may even be competitive with the SSS generation HW in terms of generation speed. In general, the above described method may easily meet the timing requirement for online SSS generation, when e.g. the cell searcher at UE is implemented in SW, or an online generation of one or more SSS sequences is needed.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device for synchronizing a communication end device with a base station, comprising:
   a primary synchronization determiner configured to determine a first synchronization parameter; and
   a secondary synchronization signal generator configured to simultaneously generate a plurality of bits of a secondary synchronization signal based on the first synchronization parameter; and
   wherein the secondary synchronization signal generator comprises:
   parameters $N_{ID}^{(1)}$, $N_{ID}^{(2)}$, $m_0$ and $m_1$;
   initial sequences $\tilde{s}$, $\tilde{c}$, and $\tilde{z}$; and
   wherein an even part of the secondary synchronization signal d(2n) and an odd part of the secondary synchronization signal d(2n+1) are generated according to equation (19), wherein equation (19) is $$d_{even}=[0,d(60),d(58),\ldots,d(2),d(0)]=\tilde{s}(m_0)XOR\tilde{c}(N_{ID}^{(2)})$$

$$d_{odd}=[0,d(61),d(59),\ldots,d(3),d(1)]=)XOR\tilde{z}(m_0 AND7)XOR\tilde{c}(N_{ID}^{(2)}+3) \qquad (19).$$

2. The device of claim 1, further comprising:
   a secondary synchronization determiner configured to determine a second synchronization parameter based on the secondary synchronization signal.

3. The device of claim 2,
   wherein the second synchronization parameter comprises a cell group identifier.

4. The device of claim 1,
   wherein the first synchronization parameter comprises a sector identifier.

5. The device of claim 1,
   wherein the secondary synchronization signal comprises a long term evolution secondary synchronization signal.

6. The device of claim 1, further comprising:
   a general purpose processor;
   wherein the secondary synchronization signal generator is implemented on the general purpose processor.

7. The device of claim 1, further comprising:
   a digital signal processor;
   wherein the secondary synchronization signal generator is implemented on the digital signal processor.

8. The device of claim 1, further comprising:
   a configurable cores processor;
   wherein the secondary synchronization signal generator is implemented on the configurable cores processor.

9. The device of claim 1, further comprising:
   a field-programmable gate array;
   wherein the secondary synchronization signal generator is implemented on the field-programmable gate array.

10. The device of claim 1,
    wherein the device is the communication end device.

11. A method for synchronizing a communication end device with a base station, comprising:
    determining a first synchronization parameter; and
    simultaneously generating a plurality of bits of a secondary synchronization signal based on the first synchronization parameter, according to the following steps:
    determining parameters $N_{ID}^{(1)}$, $N_{ID}^{(2)}$, $m_0$ and $m_1$;
    determining initial sequences $\tilde{s}$, $\tilde{c}$, and $\tilde{z}$;
    generating an even part of the secondary synchronization signal d(2n) and an odd part of the secondary synchronization signal d(2n+1) are generated according to equation (19), wherein equation (19) is $$d_{even}=[0,d(60),d(58),\ldots,d(2),d(0)]=\tilde{s}(m_0)XOR\tilde{c}(N_{ID}^{(2)})$$

$$d_{odd}=[0,d(61),d(59),\ldots,d(3),d(1)]=)XOR\tilde{z}(m_0 AND7)XOR\tilde{c}(N_{ID}^{(2)}+3) \qquad (19).$$

12. The method of claim 11, further comprising:
    determining a second synchronization parameter based on the secondary synchronization signal.

13. The method of claim 12,
    wherein the second synchronization parameter comprises a cell group identifier.

14. The method of claim 11,
    wherein the first synchronization parameter comprises a sector identifier.

15. The method of claim 11,
    wherein the secondary synchronization signal comprises a long term evolution secondary synchronization signal.

16. The method of claim 11,
    wherein simultaneously generating the plurality of bits of the secondary synchronization signal is performed on a general purpose processor.

17. The method of claim 11,
    wherein simultaneously generating the plurality of bits of the secondary synchronization signal is performed on a digital signal processor.

18. The method of claim 11,
    wherein simultaneously generating the plurality of bits of the secondary synchronization signal is performed on a configurable cores processor.

19. The method of claim 11,
    wherein simultaneously generating the plurality of bits of the secondary synchronization signal is performed on a field-programmable gate array.

20. The method of claim 11,
    wherein the method is performed in the communication end device.

21. A method for generating a secondary synchronization signal, comprising:
    storing initial sequences according to equation (12) and a look-up table, wherein equation (12) is $\tilde{s}(0)=[0,\tilde{s}(30),\tilde{s}(29),\ldots,\tilde{s}(0)]=$'0000 0100 1011 0011 1110 0011 0111 0101'

$\tilde{c}(0)=[0,\tilde{c}(30),\tilde{c}(29),\ldots,\tilde{c}(0)]=$'0000 0101 0111 0110 0011 1110 0110 1001'

$\tilde{z}(0)=[0,\tilde{z}(30),\tilde{z}(29),\ldots,\tilde{z}(0)]=$'0000 0111 0011 0111 1101 0001 0010 1011' (12), and wherein the look-up table is

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |

-continued

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | — | — | — |
| 33 | 3 | 5 | 67 | 8 | 11 | 101 | 14 | 18 | 135 | 21 | 26 | — | — | — | finding, for a given cell ID parameter $N_{ID}^{(1)}$, parameters $m_0$ and $m_1$ by the look-up table, generating an even part of the secondary synchronization signal d(2n) and an odd part of the secondary synchronization signal d(2n+1) according to equation (19), wherein equation (19) is $$d_{even}=[0,d(60),d(58),\ldots,d(2),d(0)]=\tilde{s}(m_0)\text{XOR}\tilde{c}(N_{ID}^{(2)})$$

$$d_{odd}=[0,d(61),d(59),\ldots,d(3),d(1)]=)\text{XOR}\tilde{z}(m_0\text{AND}7)\text{XOR}\tilde{c}(N_{ID}^{(2)}+3) \quad (19),$$

where XOR and AND are bit-wise binary XOR and AND operations, and where values for $\tilde{s}$, $\tilde{c}$, and $\tilde{z}$ in equation (19) are generated according to equation (12) and equation (17), wherein equation (17) is $$\tilde{s}(m)=[0, \tilde{s}(m-), \tilde{s}(m-2),\ldots, \tilde{s}(0), \tilde{s}(30), \tilde{s}(29),\ldots, \tilde{s}(m)]$$

$$\tilde{c}(m)=[0, \tilde{c}(m-), \tilde{c}(m-2),\ldots, \tilde{c}(0), \tilde{c}(30), \tilde{c}(29),\ldots, \tilde{c}(m)]$$

$$\tilde{z}(m)=[0, \tilde{z}(m-), \tilde{z}(m-2),\ldots, \tilde{z}(0), \tilde{z}(30), \tilde{z}(29),\ldots, \tilde{z}(m)] \quad (17).$$

* * * * *

UNITED STATES PATENT AND TRADEMARK OFFICE
CERTIFICATE OF CORRECTION

PATENT NO. : 8,964,723 B2
APPLICATION NO. : 13/484435
DATED : February 24, 2015
INVENTOR(S) : Wen Xu It is certified that error appears in the above-identified patent and that said Letters Patent is hereby corrected as shown below:

Claims

Claim 1 – Column 25, line 23 (equation 19):

delete " $\mathbf{d}_{odd} = [0, d(61), d(59), ..., d(3), d(1)] =) \text{XOR } \tilde{z}(m_0 \text{ AND } 7) \text{XOR } \tilde{c}(N_{ID}^{(2)} + 3)$ " and write -- $\mathbf{d}_{odd} = [0, d(61), d(59), ..., d(3), d(1)] = \tilde{s}(m_1) \text{XOR } \tilde{z}(m_0 \text{ AND } 7) \text{XOR } \tilde{c}(N_{ID}^{(2)} + 3)$ -- in place thereof.

Claim 11 – Column 26, line 11:
delete "signal $d(2n+1)$ are generated according to" and write --signal $d(2n+1)$ according to-- in place thereof.

Claim 11 – Column 26, line 17 (equation 19):

delete " $\mathbf{d}_{odd} = [0, d(61), d(59), ..., d(3), d(1)] =) \text{XOR } \tilde{z}(m_0 \text{ AND } 7) \text{XOR } \tilde{c}(N_{ID}^{(2)} + 3)$ " and write -- $\mathbf{d}_{odd} = [0, d(61), d(59), ..., d(3), d(1)] = \tilde{s}(m_1) \text{XOR } \tilde{z}(m_0 \text{ AND } 7) \text{XOR } \tilde{c}(N_{ID}^{(2)} + 3)$ -- in place thereof.

Claim 21 – Column 27, line 42 (equation 19):

delete " $\mathbf{d}_{odd} = [0, d(61), d(59), ..., d(3), d(1)] =) \text{XOR } \tilde{z}(m_0 \text{ AND } 7) \text{XOR } \tilde{c}(N_{ID}^{(2)} + 3)$ " and write -- $\mathbf{d}_{odd} = [0, d(61), d(59), ..., d(3), d(1)] = \tilde{s}(m_1) \text{XOR } \tilde{z}(m_0 \text{ AND } 7) \text{XOR } \tilde{c}(N_{ID}^{(2)} + 3)$ -- in place thereof.

Claim 21 – Column 28, line 36 (equation 17):

delete " $\tilde{s}(m) = [0, \tilde{s}(m-), \tilde{s}(m-2), ..., \tilde{s}(0), \tilde{s}(30), \tilde{s}(29), ..., \tilde{s}(m)]$ " and write -- $\tilde{s}(m) = [0, \tilde{s}(m-1), \tilde{s}(m-2), ..., \tilde{s}(0), \tilde{s}(30), \tilde{s}(29), ..., \tilde{s}(m)]$ -- in place thereof.

Signed and Sealed this
Twenty-eighth Day of June, 2016

Michelle K. Lee
*Director of the United States Patent and Trademark Office*

CERTIFICATE OF CORRECTION (continued)

Claim 21 – Column 28, line 39 (equation 17):

delete "$\tilde{\mathbf{c}}(m) = [0, \tilde{c}(m-), \tilde{c}(m-2), ..., \tilde{c}(0), \tilde{c}(30), \tilde{c}(29), ..., \tilde{c}(m)]$" and write -- $\tilde{\mathbf{c}}(m) = [0, \tilde{c}(m-1), \tilde{c}(m-2), ..., \tilde{c}(0), \tilde{c}(30), \tilde{c}(29), ..., \tilde{c}(m)]$ -- in place thereof.

Claim 21 – Column 28, line 42 (equation 17):

delete "$\tilde{\mathbf{z}}(m) = [0, \tilde{z}(m-), \tilde{z}(m-2), ..., \tilde{z}(0), \tilde{z}(30), \tilde{z}(29), ..., \tilde{z}(m)]$" and write -- $\tilde{\mathbf{z}}(m) = [0, \tilde{z}(m-1), \tilde{z}(m-2), ..., \tilde{z}(0), \tilde{z}(30), \tilde{z}(29), ..., \tilde{z}(m)]$ -- in place thereof.